United States Patent [19]

Sandage et al.

[11] Patent Number: 5,696,970

[45] Date of Patent: Dec. 9, 1997

[54] ARCHITECTURE FOR IMPLEMENTING PCMCIA CARD SERVICES UNDER THE WINDOWS OPERATING SYSTEM IN ENHANCED MODE

[75] Inventors: David A. Sandage, Forest Grove; James C. Stanley; Stewart W. Hunt, both of Portland; Arland D. Kunz, Beaverton, all of Oreg.

[73] Assignee: Intel Corporation, Santa Clara, Calif.

[21] Appl. No.: 631,950

[22] Filed: Apr. 15, 1996

Related U.S. Application Data

[63] Continuation of Ser. No. 41,705, Apr. 1, 1993, abandoned.

[51] Int. Cl.[6] .............................. G06F 13/00; G06F 9/40
[52] U.S. Cl. ...................... 395/681; 395/682; 395/685; 395/833; 395/402; 395/282; 395/710; 395/828; 395/442
[58] Field of Search .......................... 395/681, 682, 395/685, 833, 402, 282, 710, 828, 442

[56] References Cited

U.S. PATENT DOCUMENTS

| | | | |
|---|---|---|---|
| 5,175,855 | 12/1992 | Putnam et al. | 395/700 |
| 5,212,787 | 5/1993 | Baker et al. | 395/600 |

(List continued on next page.)

OTHER PUBLICATIONS

Norton, Windows Device Drivers, C Users Journal Dec.1992 V 10, n 12 p. 43(17).

Olsen, Making Windows Programs Talk, Windows–DOS Developers Journal, May 1992 V3 n5 p. 21(14).

Nelson, Bimodal Interrupt Handling Under 80286 DOS Extenders, C Users Journal Dec. 1992 V 10 n 12 p. 20(12).

Schulman, Call VxD Functions and VMM Services Easily Using OVR Generic VxD, Microsoft Systems Journal, Feb. 1993, V8 n2 p. 17(21).

Olsen, Thomas W. Making Windows and DOS Programs Talk, Windows–DOS Developer's Journal, May 1992 V3 n5 pp. 21–34.

Norton, Daniel A. Windows Device Drivers, The C Users Journal Dec. 1992, pp. 43–60.

Publication of the Personal Computer Memory Card International Association (PCMCIA) entitled: Card Services—Release 1.11; Sunnyvale, California, Aug. 16, 1992, pp. 1–136.

Publication of the Personal Computer Memory Card International Association (PCMCIA) entitled: PC–Compatible Socket Services Binding, Draft 2.00c; Sunnyvale, California, Sep. 12, 1992, pp. 1–18.

(List continued on next page.)

*Primary Examiner*—Lucien U. Toplu
*Attorney, Agent, or Firm*—Blakely, Sokoloff, Taylor & Zafman

[57] ABSTRACT

An implementation of PCMCIA Card Services for the Windows operating system in enhanced mode. A Card Services dynamic linked library (DLL) was written which contains a library of C functions which perform the Card Services functions. The Card Services DLL maintains a Card Services database of the Card Services resources available such that the Card Services DLL can share the Card Services resources among clients of Card Services. Windows applications can call the functions in the Card Services DLL directly to access Card Services functions. The Card Services DLL posts messages to a Card Services Windows application to request a Card Services function be performed with background processing. The Card Services Windows application processes the Card Services function at a later time. A Card Services virtual device driver (VxD) provides system functions to the Card Services DLL. The Card Services VxD hooks the INT 1A software interrupt such that Card Services requests which use the register based binding in the PCMCIA Card Services specification are intercepted and directed to the Card Services DLL. The Card Services VxD also traps interrupts caused by PCMCIA socket adapters and calls the appropriate interrupt handling routine in the Card Services DLL.

25 Claims, 8 Drawing Sheets

U.S. PATENT DOCUMENTS

| | | | |
|---|---|---|---|
| 5,247,681 | 9/1993 | Janis et al. | 395/700 |
| 5,319,751 | 6/1994 | Garney | 395/200 |
| 5,369,770 | 11/1994 | Thomason et al. | 395/725 |
| 5,375,241 | 12/1994 | Walsh | 395/700 |

OTHER PUBLICATIONS

Publication of the Personal Computer Memory Card International Association (PCMCIA) entitled: PCMCIA Socket Services Interface Specification, Draft 2.00c; Sunnyvale, California, Sep. 12, 1992, pp. 1–69.

ARCHITECTURE FOR IMPLEMENTING PCMCIA CARD SERVICES UNDER THE WINDOWS OPERATING SYSTEM IN ENHANCED MODE

This is a continuation of U.S. patent application Ser. No. 08/041,705, filed Apr. 1, 1993, now abandoned.

BACKGROUND OF THE INVENTION

1. Field of the Invention

This invention relates to device drivers for operating systems. More specifically to an implementation of PCMCIA Card Services for the Microsoft® Windows environment operating in enhanced mode.

2. Art Background

Laptop and notebook sized personal computers have become very common. A problem with many existing laptop and notebook sized personal computers is that it is difficult to add peripherals to such systems since there are no internal expansion slots. Peripherals can be connected to external ports on laptop and notebook sized personal computers, however, the external peripherals hang off the side of the portable computer system thereby making the system no longer portable.

To provide a convenient interface for small peripheral devices, a computer industry consortium drafted a specification defining a standard interface for credit-card sized peripherals. The computer industry consortium is known as the Personal Computer Memory Card Industry Association (PCMCIA) and the standard credit-card sized peripherals are known as PCMCIA Cards. The first version of the PCMCIA specification (PCMCIA 1.0) created an interface that could handle memory card expansion as well as some simple peripherals such as card-sized modems. The second version of the PCMCIA specification (PCMCIA 2.0) is a full bus specification capable of handling most common types of computer peripherals such as hard disk drives and LAN interfaces. (See PC Card Standard, Release 2.0, September 1991, Personal Computer Memory Card International Association)

The PCMCIA standard is defined such that it is possible to plug in and remove cards while the base system is running, without damage to the cards or to the base system. This hot insertion/removal feature is unique to PCMCIA computer hardware. Furthermore, configuration information is kept in memory on a PCMCIA card itself, to allow the system to adapt to the card when it is plugged into a computer system. The PCMCIA standard defines the physical size and shape of PCMCIA cards. The PCMCIA standard also defines power and voltage levels, and connector pinouts. Cards which comply with the PCMCIA standard may be plugged into compatible systems without fear that the connectors won't match or that voltage differences will damage the hardware. The standard also defines the range of configuration information which may be kept on the cards, and indicates how software can read this information.

The PCMCIA hardware includes the socket into which the card is plugged, a connector for conveying power and information between the cards and the computer, and a socket adapter integrated circuit which couples the computer microprocessor to the sockets. The socket adapter contains hardware to generate microprocessor interrupts when a card hardware change event occurs, such as a cards being inserted or removed, or a card battery running low. Mapping hardware allows the card's memory, I/O, and interrupt to be directed to the proper places within the overall computer system. For example, if a card contains memory, the memory may be made to appear at any point in the computer's address space below 16 megabytes. Similarly, if a card can generate an interrupt request, the interrupt request can be routed to one of a number of system IRQ lines.

The current PCMCIA standard defines two layers of software that a computer system uses to access and manage PCMCIA cards. The two layers of software are called the Socket Services layer and the Card Services layer. The Socket Services and Card Services layers are designed such that a single system may have several instances of Socket Services (each instance of Socket Services serving a corresponding PCMCIA adapter), but only a single instance of Card Services. Clients of the Card Services layer see only a number of PCMCIA sockets available but not a number of PCMCIA adapters each of which has one or more sockets. This abstraction, and the configuration management support, are the primary reasons for the Card Services software layer.

In operation, applications which wish to use PCMCIA cards access the PCMCIA cards by using the Card Services functions. Applications which use the Card Services functions are known as Card Services 'clients.' A Card Services client registers with Card Services by calling Card Services and providing some client information and the address of a client callback routine. Card Services executes the callback routine when a PCMCIA card related event occurs.

For example, when a hardware event from a PCMCIA card socket occurs, the client's callback routine performs processing associated with the event. Events include hardware events such as card insertion/removal or low battery and software events such as a client requesting exclusive use of a card. Upon card insertion, a registered client might use the callback routine to query the card to determine the card's type. If card was the correct type it would then proceed to configure the card. The card's onboard memory, I/O, and interrupt must be set up to fit the system into which the card has been plugged. Card Services functions enable clients to configure cards by programming the card hardware registers and the PCMCIA adapter.

In the real mode DOS environment of an IBM® compatible personal computer, the Socket Services software layer of the PCMCIA standard is implemented using a ROM, a device driver, or a Terminate and Stay Resident (TSR) program. Most implementations of the Socket Services layer only require about 3K of memory, a relatively small amount of memory.

The Card Services software layer is implemented in the real mode DOS environment using a device driver or a TSR program which is loaded after DOS has loaded. Since the Card Services software layer defined by the PCMCIA specification defines a large number of functions, the Card Services software layer usually requires more than 40K of memory. This relatively large amount of memory used for Card Services can present a problem.

The Microsoft® Windows operating environment is largely replacing the older DOS only environment in personal computers. The Microsoft® Windows environment provides an attractive graphical user interface (GUI) which makes application programs easier to use. The Microsoft® Windows operating environment supports DOS applications through the use of DOS virtual machines.

Currently, Windows application programs which require access to Card Services must use the existing real mode implementations of Socket Services and Card Services as device drivers or Terminate and Stay Resident (TSR) programs for DOS. This solution is not very attractive since the system must switch from protected mode which used to run Windows applications into real mode in order to call the Card Services TSR.

SUMMARY OF THE INVENTION

It is therefore an object of the present invention to provide an implementation of Card Services specifically designed for applications running in the Microsoft® Windows environment.

It is a further object of the present invention is to provide Card Services to DOS Virtual Machines operating in the Microsoft® Windows environment in the enhanced mode.

Another object of the present invention is to provide Card Services to DOS Virtual Machines in a manner which does not reduce the amount of application area memory to DOS programs.

Another object of the present invention is to provide Card Services to Virtual Devices Drivers (VxDs) operating in the Microsoft® Windows environment in the enhanced mode.

These and other objectives are accomplished by the Card Services implementation of the present invention which comprises a dynamic link library, a virtual device driver, and a windows application program.

A Card Services dynamic linked library (DLL) contains a library of C functions which perform the Card Services functions. The Card Services DLL maintains a Card Services database of the Card Services resources available such that the Card Services DLL can share the Card Services resources among clients of Card Services. Windows applications can call the functions in the Card Services DLL directly to access Card Services functions.

To handle Card Services functions that require background processing, the present invention uses a Card Services Windows application. The Card Services DLL posts messages to a Card Services Windows application to request a Card Services function be performed with background processing. The Card Services Windows application processes the Card Services function at a later time.

A Card Services virtual device driver (VxD) provides system functions to the Card Services DLL. To hand clients in DOS virtual machines, the Card Services VxD hooks the INT 1A software interrupt such that the Card Services VxD obtains control when a DOS client generates an INT 1A software interrupt to access Card Services. The Card Services VxD directs Card Services request to the Card Services DLL. The Card Services VxD also traps interrupts caused by PCMCIA socket adapters and calls the appropriate interrupt handling routine in the Card Services DLL.

BRIEF DESCRIPTION OF THE DRAWINGS

The objects, features and advantages of the present invention will be apparent to one skilled in the art, in view of the following detailed description in which.

NOTATION AND NOMENCLATURE

Figure 1:
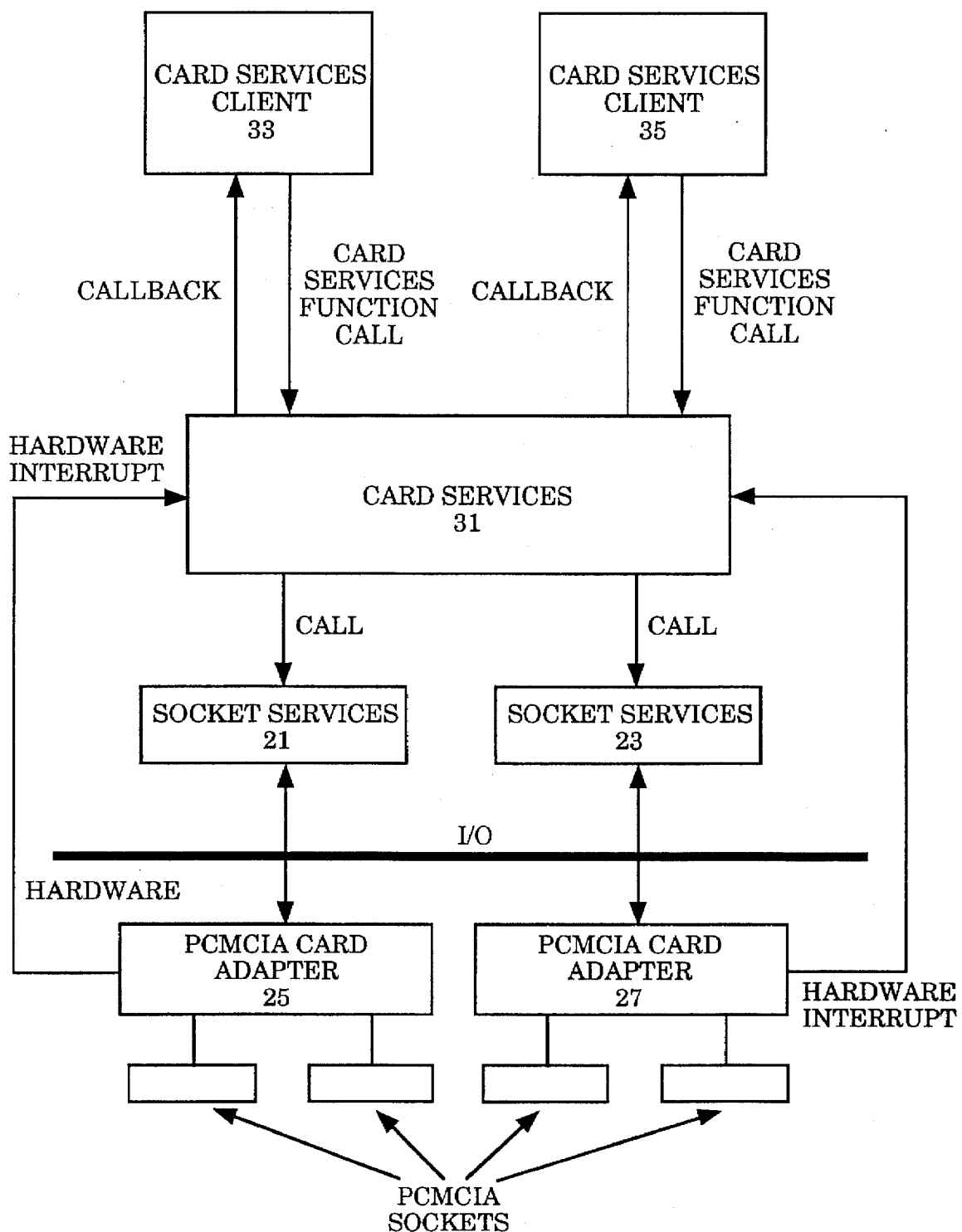
FIG. 1 is a block diagram of the Card Services and Socket services software layers defined by the PCMCIA specification as used in a computer system.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, selected, chosen, modified, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Intel Corporation, as well as other manufacturers of computer systems.

Coding Details

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in C and Intel×86 assembly language which is then compiled and assembled into machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention.

DETAILED DESCRIPTION OF THE INVENTION

An architecture for implementing PCMCIA Card Services in the Windows enhanced mode environment is disclosed. In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Card Services in Real Mode

The current PCMCIa computer system uses layers of software that a computer system uses to access and manage PCMCIA cards. The two layers of software are called the Socket Services layer and the Card Services layer. FIG. 1 illustrates how the Socket Services and Card Services software layers are related and access the PCMCIA cards.

A Socket Services layer is implemented for each particular PCMCIA socket adapter in the system. Each Socket Services implementation provides a set of routines used configure and control the corresponding PCMCIA Socket. Referring to FIG. 1, there is a different implementation of Socket Services (21 and 23) for each particular PCMCIA socket adapter (25 and 27, respectively) in the system. The Socket Services layer is designed such that it can be implemented in ROM and can be part of the system BIOS. The functions in the Socket Services software layer are called by the Card Services layer 31 using the software interrupt mechanism (INT 1A). The Socket Services layer is independent of the operating system running on the computer system. (See PCMCIA Socket Services InterfaCe Specification, Release 2.00, September 1992, Personal Computer Memory Card International Association)

The Card Services software layer is designed to run on top of one or more instances of Socket Services. Card Services provides a set of functions which Card Services clients use to access and configure PCMCIA cards. Referring to FIG. 1, the Card Services software layer 31 is located above each implementation of Socket Services and calls the routines from each Socket Services implementation to perform hardware specific functions. The Card Services software layer 31 is operating system dependent and usually is loaded during operating system startup. Like the Socket Services functions, the Card Services functions are usually called by Card Services clients (33 and 35) using the software interrupt mechanism (INT 1A with the AH register set to the hexadecimal value AF). The Card Services layer 31 is designed to hide the different PCMCIA socket adapters from Card Services clients (33 and 35), such that the Card Services clients (33 and 35) always have a consistent interface to PCMCIA Cards. (See PC Card Services Interface Specification, Release 2.00, September 1992, Personal Computer Memory Card International Association)

Figure 2:
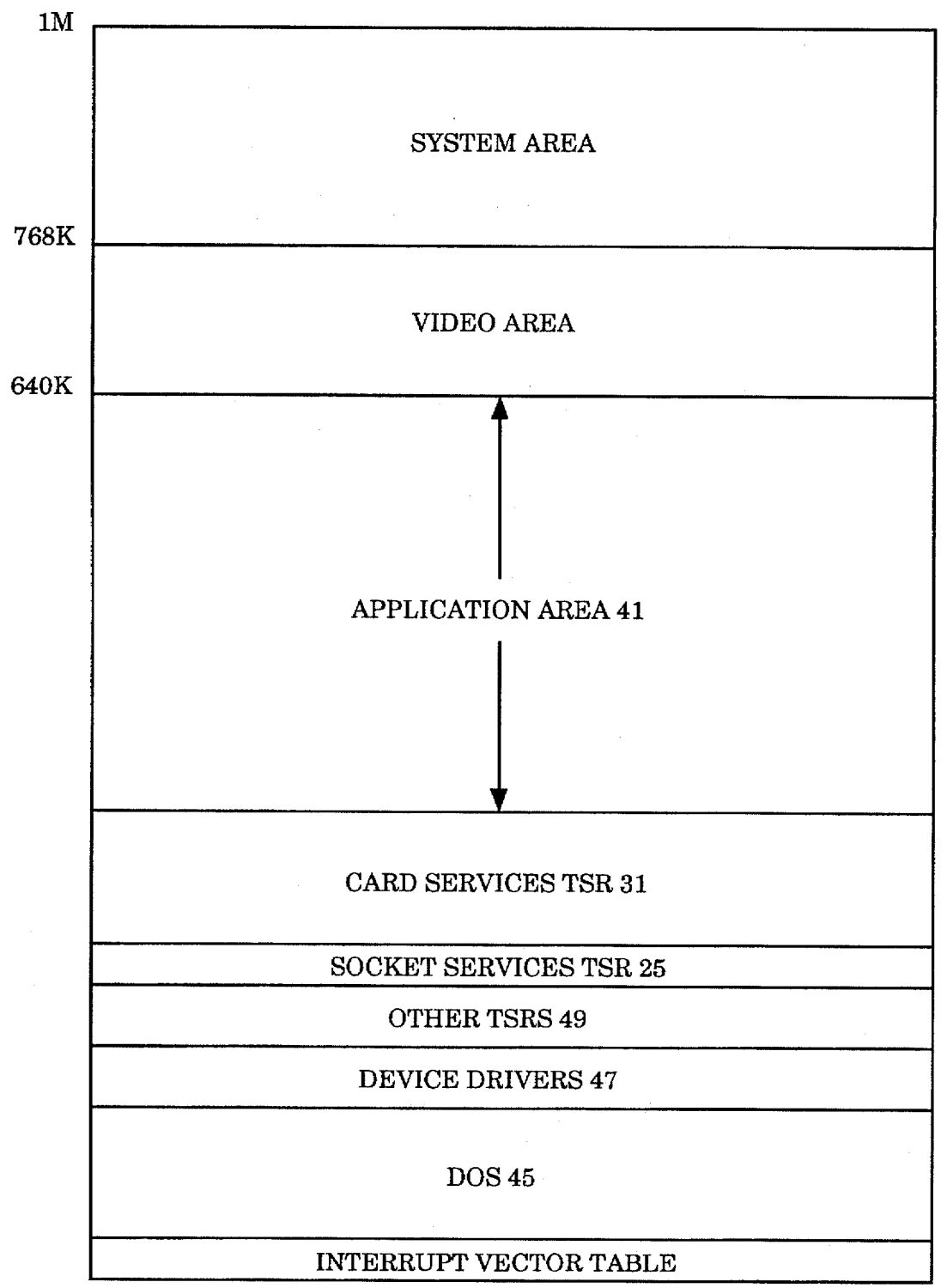
FIG. 2 is a typical memory map of a real mode DOS machine after DOS, device drivers, and Terminate and Stay Resident (TSR) programs have been loaded.

FIG. 2 illustrates a memory map of a real mode DOS machine with Card Services and Socket Services layers. In the DOS machine illustrated in FIG. 2, the Socket Services and Card Services software layers are implemented as Terminate and Stay Resident (TSR) programs. The Socket Services TSR 25 and Card Services TSR 31 use valuable memory below the 640K barrier. Since the Socket Services TSR 25 only uses about 3K of memory, it does not significantly reduce the amount of memory available to DOS applications in the application area 41. However, the 40K implementation of the Card Services TSR 31 significantly decreases the amount of real mode memory available to DOS application programs in the application area 41. It is therefore desirable to implement Card Services in a different manner such that Card Services does not use up valuable memory below the DOS 640K barrier.

The Windows Environment

To make IBM®-compatible personal computers easier to use, the IBM®-compatible personal computer market needed an operating system with a graphical user interface (GUI). To fulfill the demand for a graphical user interface for IBM-compatible personal computers, Microsoft® created Windows. Microsoft® Windows remains downwardly compatible with the existing Microsoft® DOS operating system used on IBM-compatible personal computers.

The Microsoft® Windows 3.1 system can operate in one of two modes: "standard" mode and "enhanced" mode. The standard mode exists so that personal computers equipped with older 80286 processors can use the Windows environment. The enhanced mode of Microsoft® Windows is used when Microsoft® Windows is run on a computer system which uses an 80386 or better microprocessor. Support for an older "real mode" of Windows has been dropped.

The present invention provides an implementation of the PCMCIA Card Services software layer for Microsoft® Windows. The Card Services implementation of the present invention is designed to operate only in the enhanced mode of Microsoft® Windows. In order to sufficiently disclose the Card Services implementation of the present invention, the enhanced mode of the Microsoft® Windows operating system must first be described.

The enhanced mode of Microsoft® Windows operates in the protected mode of the of the Intel 386 and 486 processors. In this manner, the enhanced mode of Microsoft® Windows takes advantage of features in the Intel 386 and 486 processors to offer virtual memory and multitasking operation. The processor hardware supports execution of several separate Windows applications in protected mode.

In the enhanced mode, Windows implements a virtual memory system in which code and data may be swapped from physical memory to a hard disk. This enables the computer system to appear to have many large programs loaded in memory simultaneously. The virtual memory mapping feature of the 386 and 486 processors also allows the operating system to map physical memory to logical locations in the processor address space. The virtual memory mapping feature is used in the present invention to map PCMCIA card memory into the system memory.

To support DOS applications, Windows uses the concept of multiple "Virtual Machines." A first virtual machine holds Windows itself, all the Windows applications, and any DOS TSRs and device drivers which were started before Windows was loaded. This first virtual machine is known as the System virtual machine (System VM). Other virtual machines are created for DOS applications which run in the Virtual 8086 mode of the Intel 386 and 486 processors. A DOS application running in virtual 8086 mode in Windows enhanced mode is said to be executing on a "DOS virtual machine" (DOS VM). Windows creates DOS virtual machines using a combination of hardware support from the microprocessor and software support from the operating system.

Figure 3:
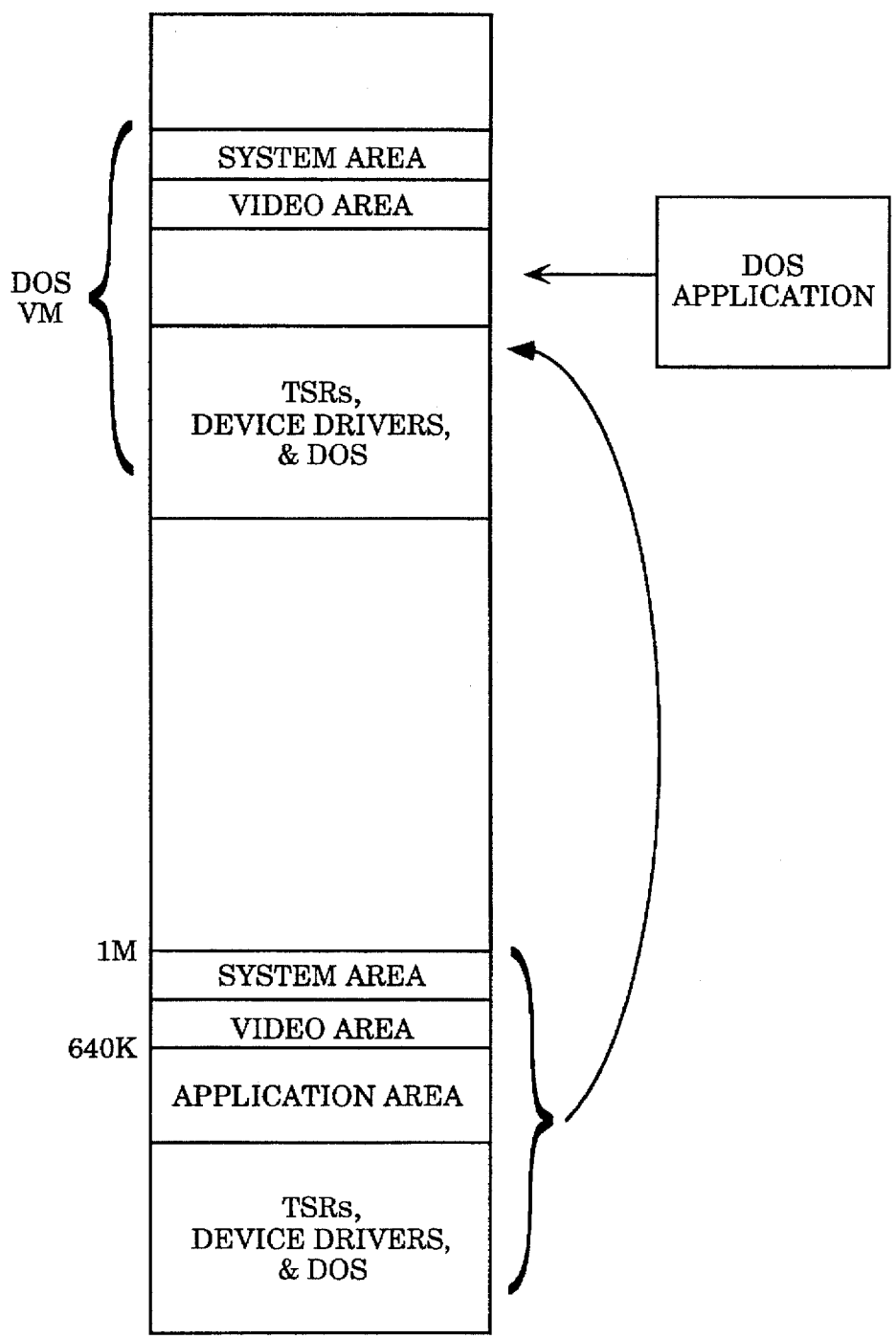
FIG. 3. is a memory map of a DOS virtual machine being created in extended memory on a system running Windows in enhanced mode.

To create a DOS virtual machine to run a DOS application, Windows makes a virtual copy of the "real mode" memory below the 1 megabyte boundary of the system VM into a region the extended memory. FIG. 3 illustrates this procedure using a memory map. The copied region becomes the address space of a DOS virtual machine. The DOS virtual machine contains a virtual copy of DOS, the device drivers, and all the Terminate and Stay Resident (TSR) programs of the real mode memory area of the system VM. The DOS, device drivers, and TSR programs of the DOS virtual machine are only "virtual" copies since the virtual memory feature of the processor is used to map the DOS, device drivers, and TSR programs of the system VM into the DOS VM. Finally, the processor enters Virtual 8086 mode of the Intel 386 or 486 processor and executes the virtual copy of DOS.

A normal 8086 processor can only see the real mode memory below the 1 megabyte boundary. In a DOS Virtual Machine, the 386 or 486 processor operating in Virtual 8086 mode uses the virtual memory feature to make the application area in the DOS VM and the DOS, device drivers, and TSR programs of the system VM appear to be a single contiguous block of real mode memory. When the microprocessor is operating in Virtual 8086 mode within the address area of DOS virtual machine, the Virtual 8086 mode microprocessor cannot see any memory outside of the DOS virtual machine.

Figure 4:
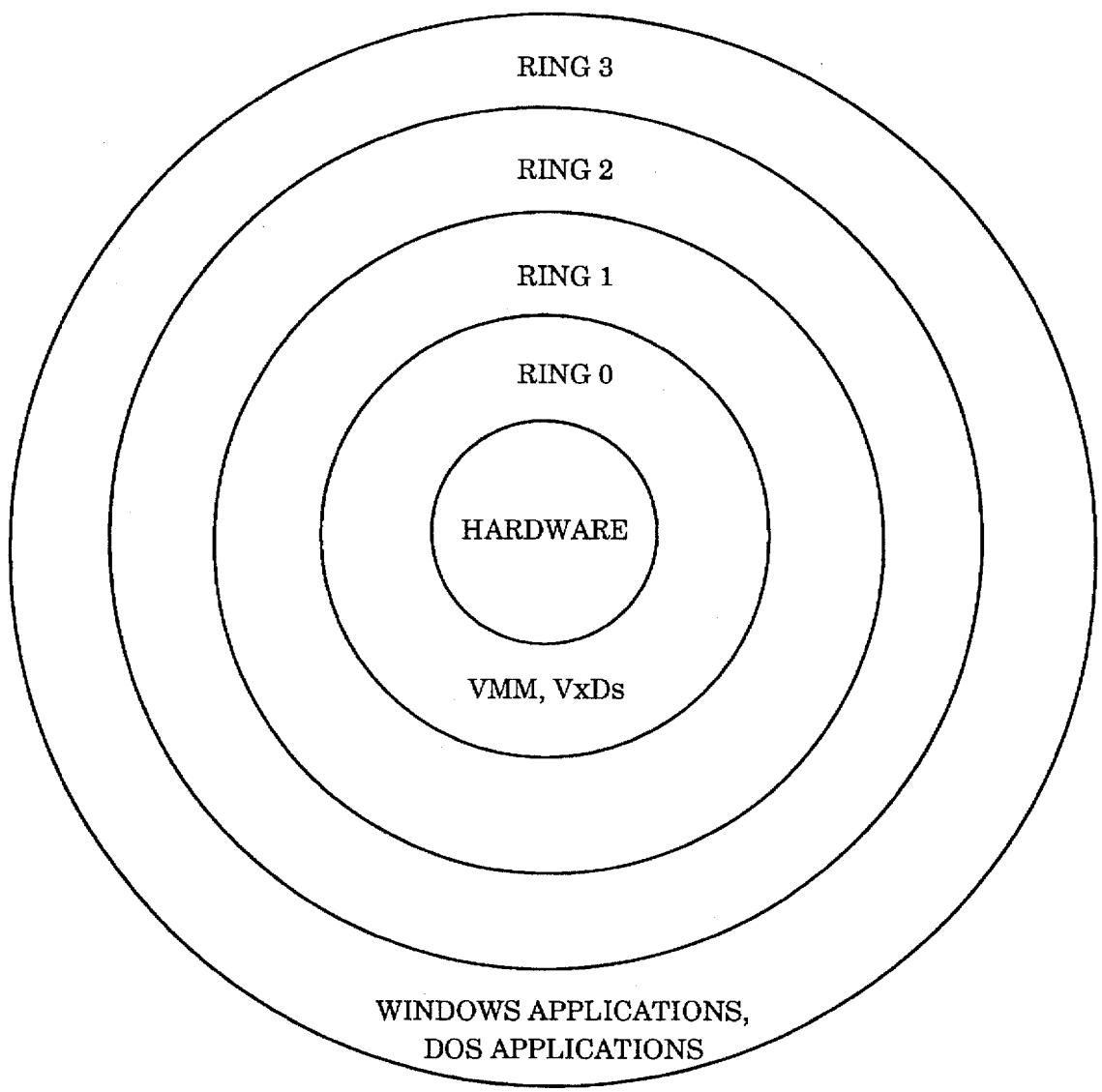
FIG. 4 is a conceptual diagram of the protection rings used by Windows operating system.

Windows uses a system of "protection rings" to help manage system resources. FIG. 4 provides a conceptual diagram of the protection ring system. At the center of the protection rings is the actual system hardware. Surrounding the hardware is ring 0, which is the most privileged protection ring. The Windows Virtual Machine Manager runs Vat ring 0. The Virtual device drivers (VxDs) also run at ring 0. At the outer ring 3 are the Windows applications, dynamic link libraries, and DOS applications.

The Virtual device drivers (VxDs) at ring 0 are a special feature of Windows enhanced mode. A virtual device driver is actually a routine which manages a system resource such that more than one application can use the system resource at a time. Virtual device drivers therefore support Windows' ability to act as a multitasking operating system. Since virtual device drivers run at ring 0, virtual device drivers have access to a wide range of kernel services, including those for hardware management, memory management, task scheduling, and communicating with other virtual devices.

Figure 5:
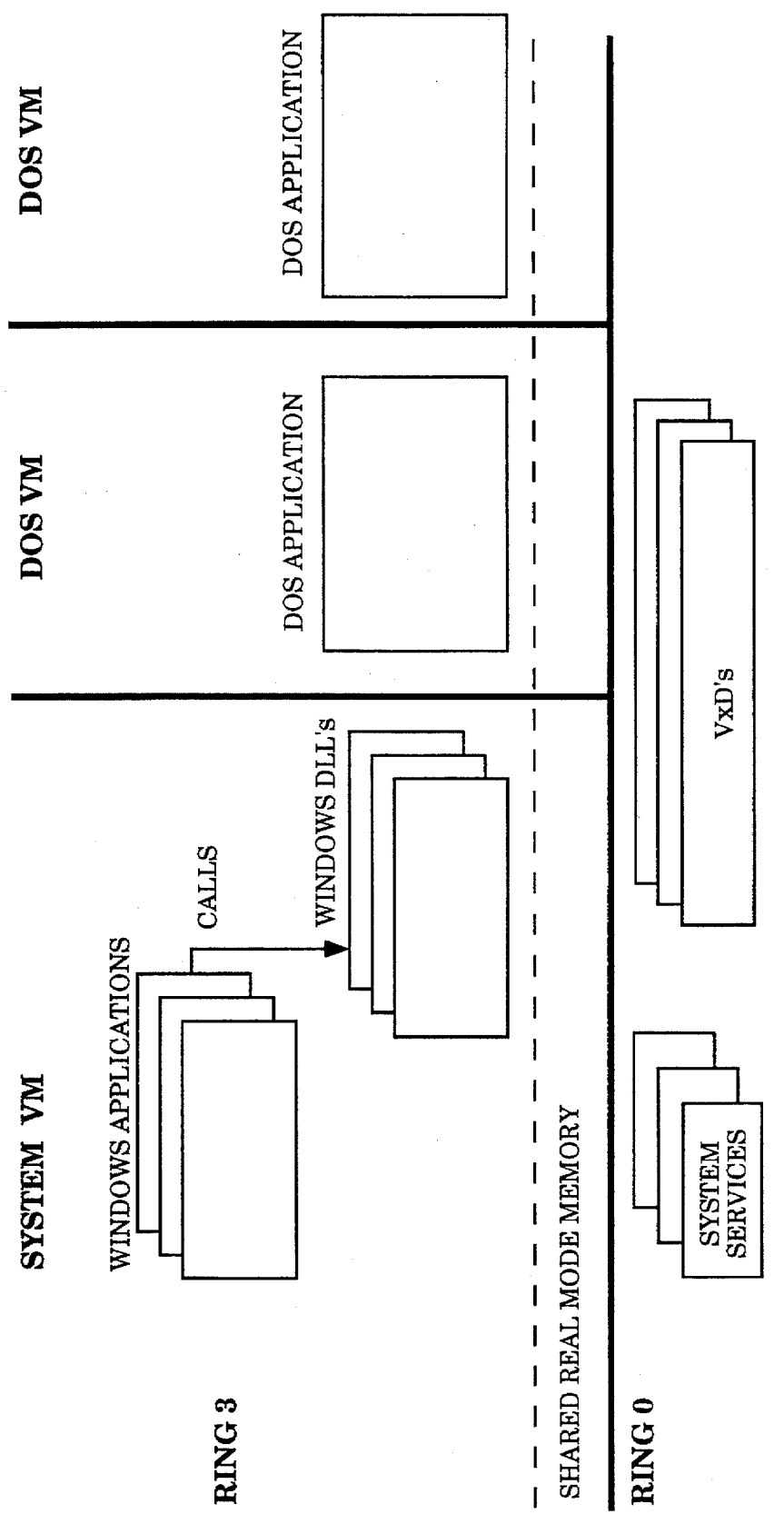
FIG. 5 is a conceptual diagram of the environment provided by the Microsoft® Windows operating in enhanced mode.

FIG. 5 provides a conceptual diagram of the Windows system in enhanced mode. At the bottom of the diagram is the computer system hardware. Just above the computer system hardware is the Ring 0 level with the Kernel and virtual device drivers (VxDs). At the top level is the system virtual machine and the various DOS virtual machines. Since Windows creates DOS virtual machines by mapping a single copy of DOS, the device drivers, and the TSR programs in the system virtual machine into the DOS virtual machines, all the virtual machines share this region of memory. This region of memory is known as the shared real mode memory.

As illustrated in FIG. 5, all the Windows applications run within the system virtual machine. The Windows Dynamic Link Libraries (DLLs) which support Windows applications also run within the system virtual machine.

Each DOS application in FIG. 5 runs within its own DOS virtual machine. Since the DOS virtual machines usually operate in the Virtual 8086 mode of the microprocessor, the DOS applications generally can only address the 1 Megabyte of memory in the DOS virtual machine.

The prior art method of adding Card Services to the environment illustrated in FIG. 5 would be to add a Card Services Terminate and Stay Resident (TSR) program into the shared real mode memory area. However, if a Card Services TSR was placed in the shared real mode memory area each of the DOS virtual machines would have 40K less memory for DOS applications. Furthermore, each of the Windows applications would need to switch from protected mode into real mode to access the Cards Services TSR.

Architectural Overview of the Present Invention

Figure 6:
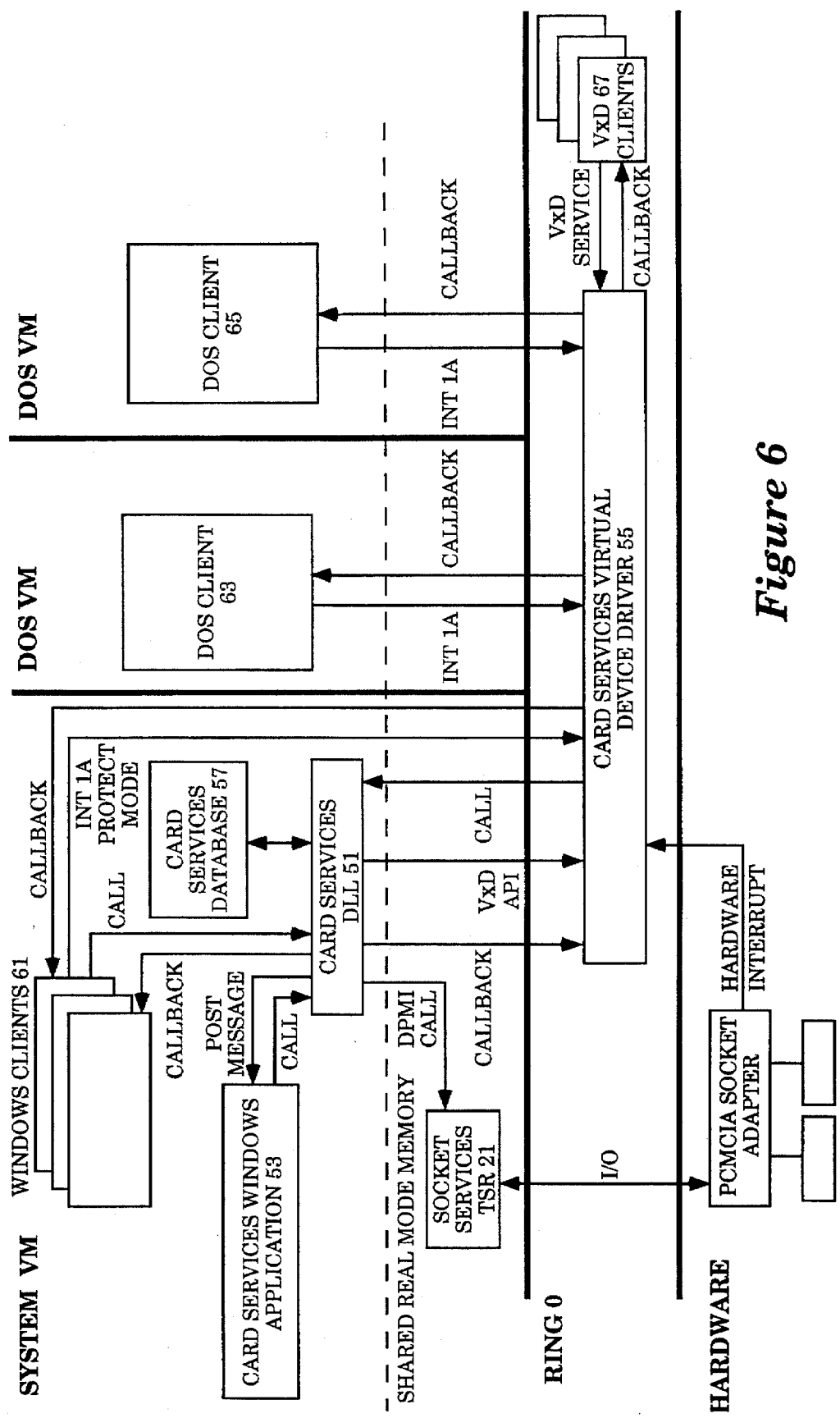
FIG. 6 is a block diagram of the Card Services implementation of the present invention within a conceptual diagram of Microsoft® Windows in enhanced mode.

In order to provide Card Services to Windows Applications, DOS applications running in DOS Virtual Machines, and Virtual Device Drivers (VxDs), the Card Services implementation of the present invention uses several of the features available in the Microsoft® Windows enhanced mode environment. Referring to FIG. 6, a block diagram of the Card Services implementation of the present invention is presented. The present invention implements card services using the combination of a Windows Dynamic Linked Library (DLL) 51, a Windows application 53, and a Virtual Device Driver (VxD) 55.

The Card Services Dynamic Linked Library (DLL) 51 and the Windows application 53 form the core of the Card Services implementation of the present invention. The Card Services DLL 51 contains code that provides the majority of the Card Services functions. The Card Services functions are implemented with a DLL in order to allow several Windows applications to share the Card Services code. The Card Services DLL 51 maintains a database 57 of Card Services resources such that it can share the Card Services resources among clients of Card Services. Certain Card Services functions and hardware events require background processing. The Card Services implementation of the present invention uses the Windows application 53 to perform the required background processing.

A variety of Card Services requirements are provided by the Card Services Virtual Device Driver (VxD) 55 of the present invention. The Card Services Virtual Device Driver (VxD) 55 provides a method of accessing the Card Services functions in the Card Services DLL 51 from DOS applications running in DOS virtual machines. The Virtual Device Driver (VxD) 55 also traps interrupts caused by PCMCIA socket adapters and calls the appropriate handling routine in the Card Services DLL 51. Finally the Virtual Device Driver (VxD) 55 also performs any functions that require system services, such as memory mapping, which are only available at ring 0.

To fully explain the Card Services implementation for the Microsoft® Windows environment provided by the present invention this specification will explain each different Card Services module individually.

The Card Services DLL

Windows provides a method of creating libraries of functions and subroutines which may be shared by a number of Windows applications. The created function libraries are referred to as Dynamic Link Libraries (DLL). Windows provides several standard Dynamic Link Libraries such as the gdi.exe DLL for graphics device interface, the User.exe DLL for Windows Management, and the krnl386.exe DLL for multitasking, memory, and resource management. A Dynamic Link Library is loaded into memory when it is needed by any Windows application. The subroutines and functions provided in a Dynamic Link Library are shared by all the Windows applications which call 601 into the DLL. (see *Windows Programmer's Guide to DLLs and Memory Management*, Mike Klein, Sams Publishing, 1992, pages 11–13).

The Card Services implementation of the present invention uses a Dynamic Link Library called the Card Services Dynamic Link Library (DLL) as a centralized provider of Card Services functions to Card Services clients. (A few asynchronous Card Services functions are performed with the help of a windows application as will be explained later.) Referring to FIG. 6, the Card Services DLL 51 is illustrated within the system VM. As illustrated in FIG. 6, Windows applications 61 can directly call 601 the functions provided in the Card Services DLL 51.

To facilitate the programming of Windows applications 61 that need Card Services functions, the Card Services DLL 51 provides a C function for every function defined in the Card Services specification. (For a list of the Card Services functions, see *PC Card Services Interface Specification*, Release 2.00, September 1992, Personal Computer Memory Card International Association) Therefore, a Windows application that needs access to a Card Services function can simply call 601 the appropriate C function provided in the Card Services DLL 51. More information on the C function library is provided in the copending application "*Protected Mode C Binding for PCMCIA Card Services Interface*", Serial No. 040,214, filed concurrently with this application. Since not every Windows application will utilize the Card Services functions in the Card Services DLL 51, a protected mode INT 1A software interrupt interface into Card Services is also provided by the present invention. The INT 1A interface into Card Services is explained in the section entitled "The Card Services Virtual Device Driver ".

Since the Card Services DLL 51 is a centralized provider of Card Services functions to many different Card Services clients, the Card Services DLL 51 must allocate the available Card Services resources among the several the Card Services clients. To keep track of the available Card Services resources, the Card Services DLL 51 maintains a database 57 of the Card Services resources. When a Card Services client requests a resource, the Card Services DLL 51 checks the Card Services database 57 to see if the resource is available. If the resource is available, the Card Services DLL 51 gives the resource to the requesting client and marks the resource as unavailable in the Card Services database 57. When a Card Services client no longer needs a resource that was allocated to it, the Card Services client informs the Card Services DLL 51 that it no longer needs the resource. The Card Services DLL 51 then marks the resource as available in the Card Services database 57.

To configure and control the Socket adapter hardware the Card Services DLL 51 uses any Socket Services layers, such as the Socket Services TSR 21 in FIG. 6, that were loaded before Windows started. Note that any other type of Socket Services implementation such as a BIOS ROM extension or a device driver would also be acceptable.

The Card Services DLL 51 access the Socket Services TSR 21 in shared real mode memory using the DOS Protected Mode Interface (DPMI) provided by Windows as illustrated in FIG. 6. The actual address used to make the DOS Protected Mode Interface call 671 is the address of the Socket Services real mode INT 1A chain. This address is provided to the Card Services DLL 51 during the initialization of the Card Services implementation. When the Card Services DLL 51 calls 671 the Socket Services layer, each registered Socket Services instance checks to see if it should respond to the call or pass the call to the next Socket Services instance.

When the Card Services DLL 51 calls 671 the Socket Services layer using the DOS Protected Mode Interface, the Card Services DLL 51 must make sure that all buffers passed to Socket Services are below the 1 megabyte real mode boundary. This must be done since the Socket Services TSR 21 runs in real mode and therefore cannot access any memory above the 1 megabyte real mode boundary.

The Card Services Windows Application

The PCMCIA Card Services specification states that certain Card Services functions must be performed in the background. That is, the Card Services function must only perform minimal processing of the input parameters and then immediately return to the caller of the function. The majority of the processing of the input parameters must be performed at some later time. For example, the Card Services client registration function, exclusive card use request function, and hardware event interrupts all require background processing.

In the prior art DOS real mode implementations of Card Services, the background processing is done by the Card Services TSR using the clock ticks. Referring to FIG. 2, a DOS application or a device driver calls a function in the Card Services TSR. The Card Services TSR then sets up a background processing operation and returns to the DOS application or the device driver that called the Card Services TSR. The Card Services TSR then performs the background processing when it is occasionally called by DOS using the clock ticks.

Referring to FIG. 5, although the DOS virtual machines created in the Windows enhanced mode environment do a very good job of simulating a normal real mode DOS environment, not every feature of the real mode DOS environment is replicated perfectly. One feature that does not work perfectly are the clock ticks used by many Terminate and Stay Resident (TSR) programs. In a Windows enhanced mode DOS virtual machine, the clock ticks do not occur at reliable intervals. Therefore, programs relying upon clock ticks may not operate reliably. The implementation of the present invention therefore needed a more reliable method of performing background processing.

To perform background processing for Card Services, the present implementation of Card Services spawns a Windows application called the Card Services Windows Application. Referring to FIG. 6, the Card Services Windows Application 53 is illustrated within the system virtual machine. The Card Services Windows Application 53 operates like most Windows applications in that it is message driven. The Card Services Windows Application 53 monitors an input message queue and processes messages received on the queue.

The Card Services functions in the Card Services DLL 51 use the Card Services Windows Application 53 when a function needs background processing. To initiate background processing a Card Services function in the Card Services DLL 51 calls the Windows routine Post Message 641 to place a message on Card Services Windows application 53 message queue. The Card Services Windows Application 53 eventually retrieves the message from the message queue and processes the message. The Card Services Windows Application 53 processes the message by calling 643 routines within the Card Services DLL 51.

For example, the PCMCIA Card Services specification requires that hardware events generated by the PCMCIA adapters, such as card insertion, be processed in the background. Therefore, when a hardware event is detected and the proper Card Services interrupt handling function in the Card Services DLL 51 is called, the interrupt handling function acknowledges the interrupt and posts a message to the Card Services Windows Application 53. The Card Services Windows Application 53 eventually retrieves the message from its message queue and processes the message. The Card Services Windows Application 53 handles the message by calling 643 a background interrupt handler within the Card Services DLL 51. The use of the Windows messaging mechanism ensures that interrupt processing occurs in the same order that the hardware interrupts occurred.

Most background processing is completed by calling a "callback" routine provided by a Card Services client during client registration to inform the Card Services client about the result of the background processing. The callback routine provided by the Card Services client handles the result of the background processing operation. Therefore while the Card Services Windows Application's thread of execution is within the Card Services DLL 51 a callback 603 is made into the client callback address. Callbacks into Windows application clients that use the INT 1A Card Services interface, DOS application clients, and virtual device driver (VxD) clients must be handled in a slightly different manner.

To use a callback routine provided by a DOS application client or a VxD client, a jump is made into a callback handling routine within the Card Services Virtual Device Driver 55. The Card Services Virtual Device Driver 55 then executes the callback routine directly into the DOS application client or the virtual device driver (VxD) client. Callbacks into DOS virtual machine clients and virtual device driver (VxD) clients are explained in the following section on the Card Services Virtual Device Driver 55.

The Card Services Virtual Device Driver

The Card Services Virtual Device Driver (VxD) 55 provides a number of different services for the Card Services implementation of the present invention. Microsoft® Windows Virtual Device Drivers have a number of unique features that make Virtual Device Drivers very useful. Virtual Device Drivers are not dedicated to any single virtual machine such that a Virtual Device Driver may be used by a program running in any virtual machine. Since Virtual Device Drivers run at privilege ring 0, a Virtual Device Driver can access all I/O ports directly and can access the entire memory address space of the machine. Each service provided by the Card Services Virtual Device Driver (VxD) 55 is explained individually below.

Handling Socket Adapter Interrupts

The PCMCIA Card Services specification requires the Card Services software layer to catch all status change interrupts generated by the PCMCIA socket adapters and inform the interested Card Services clients. Referring to FIG. 5, there can be several Card Services clients operating simultaneously in the different virtual machines of the Windows enhanced mode environment. To inform the interested Card Services clients operating in different virtual machines about the interrupts, the Card Services implementation of the present invention uses the Card Services Virtual Device Driver 55.

To catch the status change interrupts from the PCMCIA socket adapters, the Card Services Virtual Device Driver 55 first sets up on IQR RER each socket adapter. To set up an IRQ, the Card Services Virtual 55 uses the services of the Virtual PIC Driver (VPICD). The Card Services Virtual Device Driver 55 virtualizes the status change interrupts by calling the system routine VPICD_Virtualize_IRQ along with an IRQ descriptor. The IRQ descriptor includes the IRQ number and the address of an interrupt handling routine within the Card Services Virtual Device Driver 55. After the Card Services Virtual Device Driver 55 has virtualized the IRQ, the Card Services Virtual Device Driver's hardware interrupt handling routine will be called whenever a PCMCIA socket adapter generates a status change interrupt.

Figure 7:
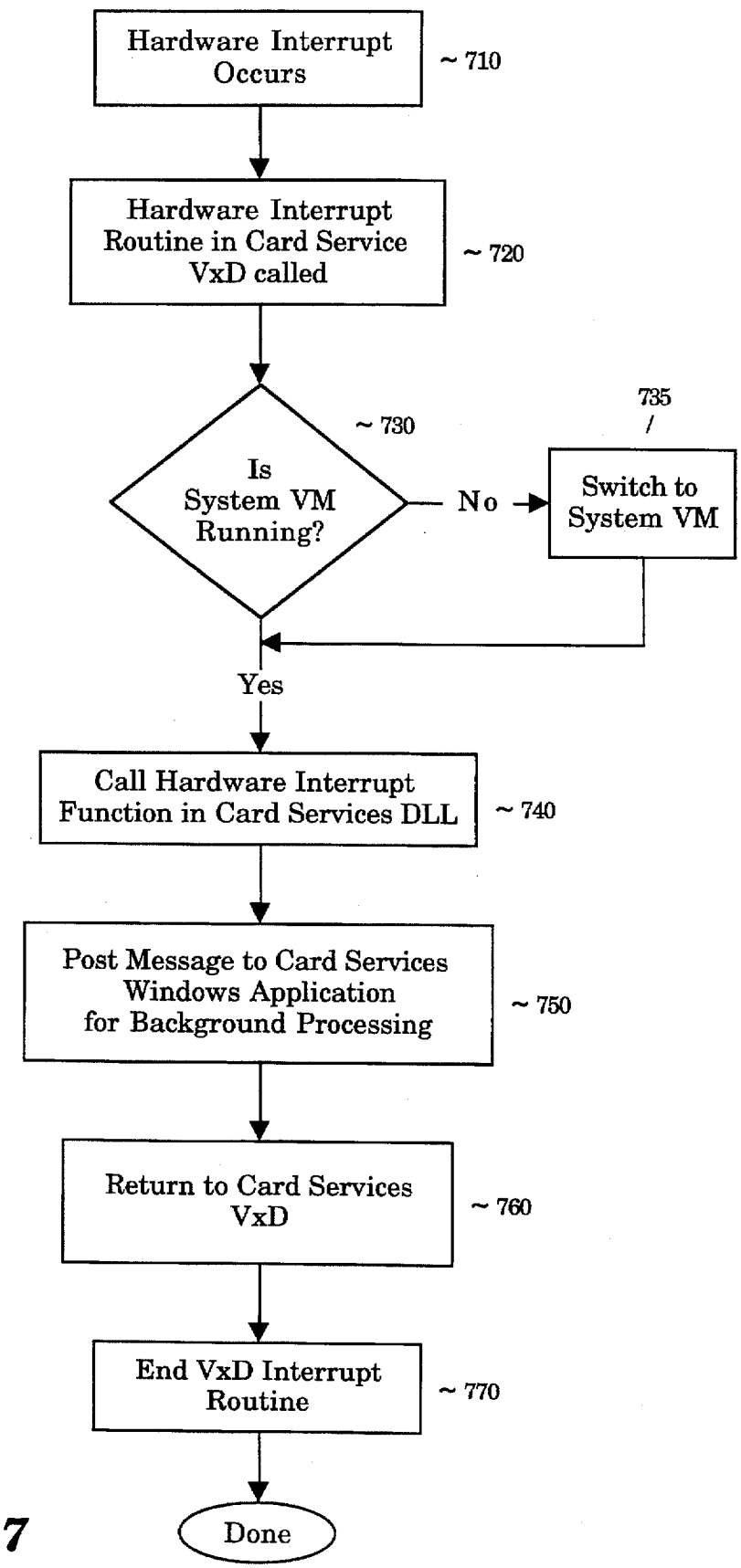
FIGS. 7 and 8 are flow diagrams of the Card Services implementation of the present invention.

To handle a status change interrupt generated by a PCMCIA socket adapter, the following sequence of events occur as illustrated in FIG. 7. First, the Card Services Virtual Device Driver's hardware interrupt handling routine is called (step 720) after [when] a hardware status interrupt 631 is generated at step 710. If the System VM was not running when the interrupt occurred, then the interrupt handling routine then requests the kernel schedule a switch to the system VM at step 735 so that the interrupt handling routine can access the Card Services DLL 51. Next, the Card Services Virtual Device Driver 55 calls 655 the appropriate hardware interrupt function in the Card Services DLL 51 at step 740. The hardware interrupt function in the Card Services DLL 51 function handles hardware events by first acknowledging the interrupt with Socket Services and then posting 641 a message to the Card Services Windows Application 53 at Step 750. As previously explained, the Card Services Windows Application 53 will process the hardware interrupt in the background. After posting the message the Card Services DLL 51 function completes and returns to the Card Services Virtual Device Driver 55 at step 760. Since Card Services DLL 51 handled the interrupt, the Card Services Virtual Device Driver 55 signals an end to the interrupt routine at Step 770.

DOS Virtual Machine Card Services Interface

Referring to FIG. 6, the Card Services DLL 51 containing the Card Services functions is located within the System VM. Since the DOS Virtual Machines in FIG. 6 operate in Virtual 8086 Mode, a DOS program cannot see or access anything outside of its own DOS virtual machine. Therefore, DOS applications and DOS device drivers operating in DOS virtual machines cannot directly access the Card Services functions in the Card Services DLL 51 located within the System VM.

To provide access to the Card Services functions in the Card Services DLL 51 to Card Services clients located in DOS Virtual Machines, the present invention uses the Card Services Virtual Device Driver (VxD) 55. To maintain compatibility with existing DOS applications that use standard PCMCIA Cards, the Card Services Virtual Device Driver 55 provides Card Services to clients in DOS Virtual Machines in a manner such that the DOS clients use the standard real mode Card Services Binding defined in the PCMCIA Card Services Specification. Specifically, Card Services clients located in DOS virtual machines access Card Services functions by loading the AH register with the hexadecimal value AF and executing an INT 1A software interrupt instruction. (See Appendix D of the *PC Card Services Interface Specification*, Release 2.00, September 1992, Personal Computer Memory Card International Association)

To catch the Card Services function requests from Card Services clients located in DOS Virtual Machines, the Card Services Virtual Device Driver 55 must "hook" the INT 1A software interrupt. The Card Services Virtual Device Driver 55 hooks the INT 1A software interrupt by calling the system routine Hook_V86_Int_Chain with the 1A interrupt number and the address of routine in the Card Services Virtual Device Driver 55 which handles Card Services function calls from DOS clients. After hooking the INT 1A software interrupt, all further Card Service INT 1A function calls 651 by DOS applications or device drivers operating in DOS virtual machines will be routed to the Card Services Virtual Device Driver 55.

Figure 8:
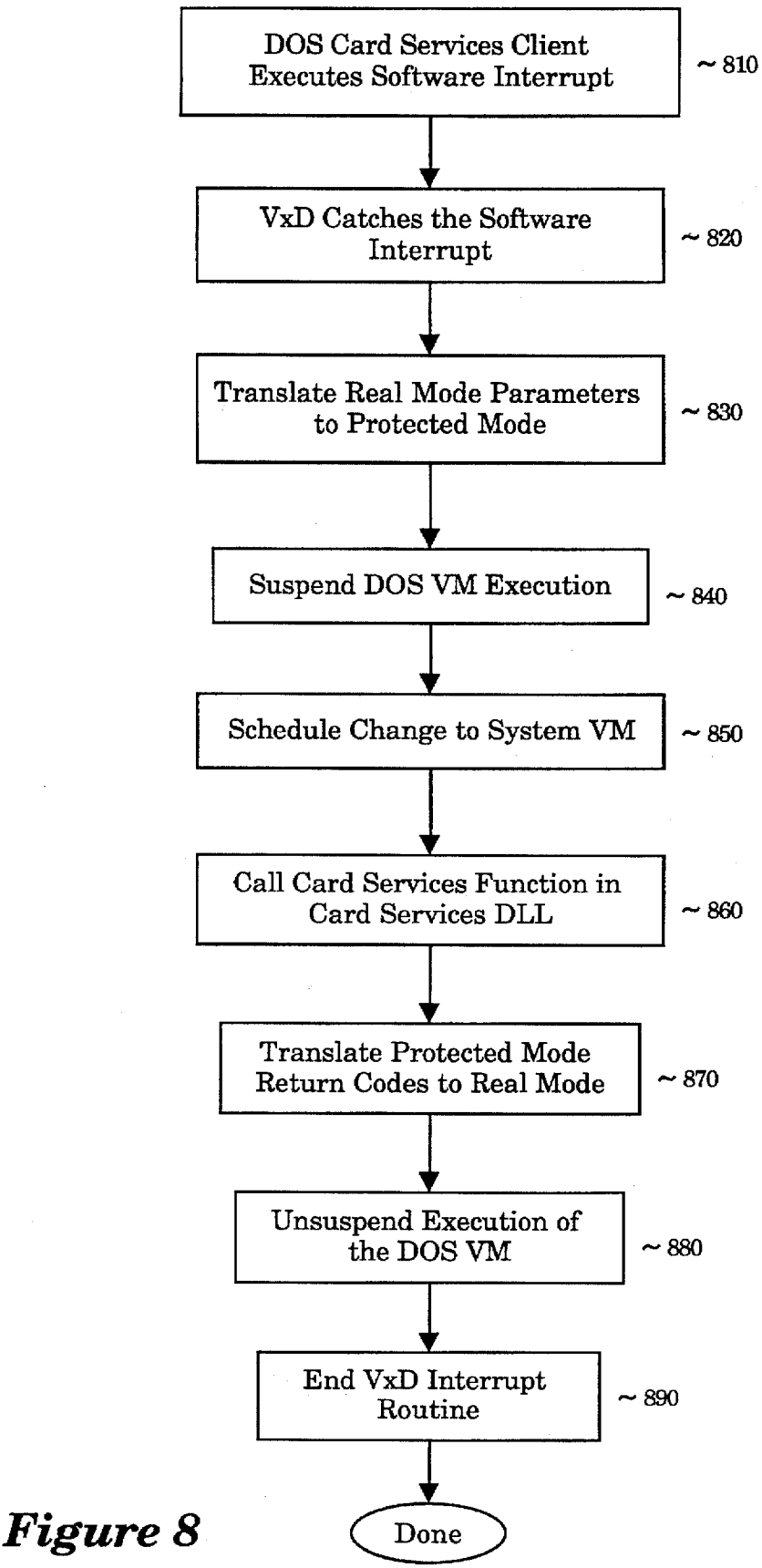

Card Services function calls from clients in DOS virtual machines are handled by the Card Services Virtual Device Driver 55 in the following manner as illustrated in FIG. 8. First, the client in DOS virtual machine sets up the function parameters for a Card Services function call and executes the INT 1A software interrupt 651 in step 810. The Card Services Virtual Device Driver 55 gets control after the interrupt at step 820 since the Card Services Virtual Device Driver 55 has "hooked" the INT 1A software interrupt. After obtaining control, the Card Services Virtual Device Driver 55 cannot immediately call the required function in the Card Services DLL 51 since any function parameters supplied by the client in the DOS VM are in real mode. The Card Services Virtual Device Driver 55 therefore translates the real mode parameters supplied by the Card Services client in DOS VM into protected mode parameters for the Card Services DLL 51 at step 830. The Card Services Virtual Device Driver 55 requests the Process scheduler in the Windows kernel to suspend execution on the DOS virtual machine containing the Card Services client that made the Card Services function call using a Windows system routine at step 840. The Card Services Virtual Device Driver 55 also requests the Process scheduler to schedule the System VM at step 850 so it can access the Card Services DLL 51. The Card Services Virtual Device Driver 55 then calls 655 the proper Card Services function within the Card Services DLL 51 at step 860. Upon completion of the Card Services function within the Card Services DLL 51, the thread of execution is transferred back to the Card Services Virtual Device Driver 55. The Card Services Virtual Device Driver 55 then needs to translate any return codes back into real mode for the DOS virtual machine at step 870. Finally, the Card Services Virtual Device Driver 55 unblocks the client's DOS virtual machine at step 880 so that the DOS virtual machine is free to resume execution and ends the VxD interrupt routine at step 890. When the DOS virtual machine is next scheduled for execution, processing resumes with the instruction after the INT 1A software interrupt instruction. A complete description of the method of accessing the Card Services DLL 51 from DOS clients is provided in the copending application "A Method and Apparatus for Sharing A Common Routine Stored In A Single Virtual Machine Operating In a Preemptive Multitasking Computer System", U.S. Pat. No. 5,414,848, issued on May 9, 1995.

Besides handling Card Services functions calls for Card Services clients located in DOS Virtual Machines, the Card Services Virtual Device Driver 55 also performs the "callbacks" into DOS Virtual Machines. For example, to notify a Card Services client located in DOS Virtual Machine about a hardware interrupt, the Card Services Virtual Device Driver 55 executes the callback routine 652 into the DOS Virtual Machine Card Services client which was provided during client registration.

As explained in the Card Services Window Application section, a callback into a DOS virtual machine is initiated by the Card Services Window Application 53 thread of execution in the Card Services DLL 51. The thread of execution in the Card Services DLL 51 requests a callback into a DOS virtual machine client by calling 657 a callback handling routine in the Card Services Virtual Device Driver 55. The Card Services Virtual Device Driver 55 then schedules a task switch into the DOS virtual machine. Mter the kernel has switched into the specified DOS virtual machine, the Card Services Virtual Device Driver 55 calls the system routine Begin_Nest_V86_Exec to prepare for nested execution into the DOS virtual machine. The Card Services Virtual Device Driver 55 then calls the callback routine 652 specified by the Card Services client in the DOS virtual machine. After completing the callback routine, the Card Services Virtual Device Driver 55 calls the system routine End_Nest_Exec to restore the DOS virtual machine state.

Protected Mode INT 1A Card Services Interface for Windows Applications

Not every Windows application which requires Card Services will take advantage of the library of Card Services functions provided by the Card Services DLL 51. Some Windows applications will instead use the more complicated register based INT 1A software interrupt binding. To handle such Windows applications, the Card Services Virtual Device Driver 55 provides a protected mode INT 1A Card Services interface 653.

As previously described, the Card Services Virtual Device Driver 55 "hooks" the INT 1A software interrupt such that whenever an INT 1A software interrupt 653 occurs, the Card Services Virtual Device Driver 55 obtains control. When a Windows application generates an INT 1A software interrupt, the Card Services Virtual Device Driver 55 obtains the function parameters from the processor registers. The Card Services Virtual Device Driver 55 then uses the parameters to call the appropriate Card Services function in the Card Services DLL 51.

The Card Services Virtual Device Driver 55 also performs the callbacks into Windows applications which use the register based INT 1A software interrupt binding. A callback 656 into a Windows application that uses the protected mode INT 1A software interrupt is initiated by the Card Services Window Application 53 thread of execution within the Card Services DLL 51. The thread of execution in the Card Services DLL 51 requests a callback into a Windows application client by calling a callback handling routine 657 in the Card Services Virtual Device Driver 55. The callback handling routine in the Card Services Virtual Device Driver 55 calls the system routine Begin_Nest_Exec to prepare for nested execution into the Windows application. The Card Services Virtual Device Driver 55 then calls the callback routine 656 specified by the Windows application. After completing the callback routine, the Card Services Virtual Device Driver 55 calls the system routine End_Nest_Exec to restore the state of the system VM.

Card Services Interface for other Virtual Device Drivers (VxDs)

The Card Services Virtual Device Driver 55 also provides a Card Services interface for other Windows virtual device drivers. Referring to FIG. 6, virtual devices drivers 67 call Card Services functions by making a VxD service call 681 into the Card Services Virtual Device Driver 55. The Card Services Virtual Device Driver 55 then executes the Card Services function calls by translating the parameters and calling 655 into the Card Services DLL 51. This is performed in essentially the same manner as described in the previous section on providing Card Services functions to Windows application clients that use the INT 1A software interrupt interface.

To create a virtual device driver that uses Card Services, the virtual device driver must be created with the file PCCARD.INC. This file contains the Card Services Virtual Device Driver service access table that will allow the client virtual device driver to use the VxDCall macro to call Card Services in the Card Services Virtual Device Driver The virtual device driver Card Services interface is not available during system initialization. Therefore virtual device driver Card Services clients 67 should register with Card Services while processing the Init_Complete message received from the system. This will still give the virtual device driver clients 67 a chance to abort loading the Card Services Virtual Device Driver 55 is not present. Finally, as with all VxD services, the virtual device driver Card Services clients 67 should first call PCCARD_Get_Version to ensure that the Card Services Virtual Device Driver 55 is loaded before attempting to use any of the available Card Services functions.

There are two methods of creating a Card Services interface for virtual device driver Card Services clients 67. The first method is to use a single VxD service address into the Card Services Virtual Device Driver 55. Using this method, one register is used to specify which Card Services function should be performed and the function parameters are passed in other registers. The following presents the recommended binding in the Card Services specification for 0:32 protected mode clients which could be used:

[AL]=Card Services Function
[DX]=Card Services Client Handle
[ESI]=Pointer (32 bit offset)
[CX]=ArgLength
[EBX]=ArgPointer (32 bit offset)
Return codes:
[AX]=Status
[CH]=reset to zero when request was successful, set to one when request failed Where the Register Client argument packet ClientData field is defined to be:

| Offset | Description |
|---|---|
| 0 | 16 bit data determined by client |
| 2 | 16 bit reserved (reset to zero) |
| 4 | 32 bit offset determined by client |

The second method of providing a Card Services interface to virtual device driver Card Services clients 67 is to provide multiple VxD service addresses such that there is one address for each Card Services function. The virtual device driver clients 67 would then access Card Services functions by calling the VxD service address into the Card Services Virtual Device Driver 55 corresponding to the desired Card Services function.

The Card Services Virtual Device Driver 55 also handles callbacks 658 into Virtual Device Drivers that are Card Services clients 67. The Card Services Virtual Device Driver 55 performs a direct call into the callback address provided by the virtual device driver Card Services client 67. During the callback, the callback parameters are loaded into the processor registers as specified below:

[AL]=Function
[CX]=Socket
[DX]=Info
[DI]=first word of RegisterClient argument packet ClientData field
[ESI]=third and fourth word of RegisterClient argument packet ClientData field
[EBP]=MTD request
[EBX]=Buffer
[BX]=Misc. (when no buffer is specified) Return codes:
[AX]=Status on return to Card Services
[CF]=returned reset to zero when the callback completed successfully, set to one if Status is not SUCCESS.

Handling Special Card Services Functions

Some Card Services functions defined in the PCMCIA Card Services specification require special operating system calls not available to normal application programs running at protection rings 1–3. For example, the Card Services function "MapMemPage" maps memory on a PCMCIA into system memory. In order to map memory from a PCMCIA into system memory, certain system calls which can only be accessed from ring 0 are needed.

To complete such functions, the Card Services DLL 51 calls 659 routines in the Card Services Virtual Device Driver 55. Since the Virtual Device Driver (VxD) 55 runs in ring 0, it has access to all the system services available.

The foregoing has described an architecture for implementing PCMCIA Card Services in the Windows enhanced mode environment. It is contemplated that changes and modifications may be made by one of ordinary skill in the art, to the materials and arrangements of elements of the present invention without departing from the scope of the invention.

We claim:

1. A computer implemented method for providing PCMCIA Card Services to a Windows application running on the Windows operating system or a DOS application running in a DOS virtual machine in said Windows operating system, said method comprising the steps of:

spawning a Card Services Background Processing application, said Card Services Background Processing application comprising a standard Windows application;

initializing a Card Services Dynamic Link Library, said Card Services Dynamic Link Library comprising a plurality of software functions corresponding to a plurality of Card Services functions such that each software function performs the requirements of the corresponding Card Services function;

calling a software function in a Card Services Dynamic Link Library from said Windows application if said Windows application needs Card Services;

posting a message containing a set of function parameters to said Card Services Background Processing application from said software function if said software function requires asynchronous processing;

calling a Card Services virtual device driver from said software function in said Card Services Dynamic Link Library, said Card Services virtual device driver performing Ring 0 operating system services for said Card Services Dynamic Link Library;

hooking a software interrupt such that said Card Services virtual device driver obtains control when said DOS application executes a software interrupt instruction; and calling a software function in said Card Services Dynamic Link Library from said Card Services virtual device driver when said Card Services virtual device driver obtains control if said DOS application requests Card Services by executing said interrupt instruction.

2. The computer implemented method as claimed in claim 1, wherein said method further comprises the steps of:

returning from said first software function to said Card Services client application after posting said message to said Card Services Background Processing application.

3. The computer implemented method as claimed in claim 1, wherein said method further comprises the steps of:

calling a processing routine in said Dynamic Link Library from said Card Service Background Processing application to process said set of function parameters received by said Card Services Backgropund Processing Application;

calling a client callback routine in said Windows application from said processing routine in said Card Services Dynamic Link Library to inform said Windows application of a result generated by said Card Services function.

4. The computer implemented method as claimed in claim 1, wherein said Card Services Dynamic Link Library maintains a Card Services database containing a set of resources available to said Card Services Dynamic Link Library.

5. The computer implemented method as claimed in claim 1, wherein said method further comprises the step of:

calling a Socket Services software layer from said Card Services Dynamic Link Library to execute a Socket Services function, said step of calling a Socket Services software layer performed using a DOS Protected Mode Interface (DPMI) interface.

6. The computer implemented method as claimed in claim 1, wherein a callback into said DOS application running in said DOS Virtual machine is performed by the substeps of:

calling said Card Services virtual device driver from said Card Services Background Processing application when a callback into said DOS application running in said DOS Virtual machine must be performed; and calling a callback routine in said DOS application running in said DOS Virtual machine from said Card Services virtual device driver using nested execution.

7. The computer implemented method as claimed in claim 1, wherein said method further comprises the steps of:

virtualizing an IRQ interrupt generated by a PCMCIA socket adapter such that said Card Services virtual device driver obtains control when said IRQ interrupt generated by said PCMCIA socket adapter occurs; and handling said interrupt generated by a PCMCIA socket adapter by calling an interrupt handing function in said Card Services Dynamic Link Library from said Card Services virtual device driver when said Card Services virtual device driver obtains control after said IRQ interrupt generated by said PCMCIA socket adapter occurs.

8. The computer implemented method as claimed in claim 1, wherein said method further comprises the step of:

calling a Card Services interface in said Card Services virtual device driver using a virtual device driver service call to provide Card Services to other virtual device drivers.

9. In an IBM PC-compatible computer system, said IBM PC-compatible computer system having a PCMCIA socket adapter, said IBM PC-compatible computer system running a Windows operating system, an apparatus that provides PCMCIA Card Services to a Windows application running on the Windows operating system or a DOS application running in a DOS virtual machine in said Windows operating system, said apparatus comprising the elements of:

background processing means, said background processing means comprising a standard Windows application, said background processing means having a receive message queue for receiving messages containing a set of Card Services function parameters, said background processing means processing said set of Card Services function parameters;

Card Services function means, said Card Services function means comprising a dynamic link library with a plurality of software functions, said plurality of software functions corresponding to a plurality of Card Services functions such that each software function performs the requirements of the corresponding Card Services function;

system service means, said system service means comprising a Card Services virtual device driver running on said IBM PC-compatible computer system with an interface accessible by said Card Services function means, said Card Services virtual device driver providing Ring 0 operating system services to said Card Services function means;

software interrupt hooking means, said software interrupt hooking means obtaining control for said DOS application Card Services means when a DOS Card Services client application executes a software interrupt instruction; and Card Services function calling means, said Card Services function calling means calling a software function in said Card Services function means from said DOS application Card Services means when said software interrupt hooking means obtains control after said software interrupt is executed by said DOS Card Services client application.

10. The apparatus as claimed in claim 9, wherein said apparatus further comprises:

client callback means, said client callback means informing Windows application of a result generated by said background processing means.

11. The apparatus as claimed in claim 9, wherein said Card Services function means maintains a Card Services database containing a set of resources available to said Card Services function means.

12. The apparatus as claimed in claim 9, wherein said apparatus further comprises:

Socket Services means, said Socket Services means performing hardware specific functions for said socket adapter, said Card Services function means accessing said Socket Services means using a DOS Protected Mode Interface (DPMI) interface.

13. The apparatus as claimed in claim 11, wherein said apparatus further comprises a DOS client callback means for performing a callback into said DOS application located in said DOS virtual machine, said DOS client callback means comprising:

callback transfer means, said callback transfer means transferring a result generated in said background processing means to said DOS client callback means; and nested execution means, said nested execution means calling a callback routine in said Card Services client located in said DOS virtual machine from said DOS client callback means.

14. The apparatus as claimed in claim 9, wherein said apparatus further comprises a hardware interrupt handling means, said hardware interrupt handling means comprising:

interrupt virtualizing means, said interrupt virtualizing means virtualizing an interrupt generated by said PCMCIA socket adapter such that said hardware interrupt handling means obtains control when said interrupt generated by said PCMCIA socket adapter occurs; and interrupt handling means, said interrupt handling means handling said interrupt generated by said PCMCIA socket adapter by calling an interrupt handing function in said Card Services function means when said hardware interrupt handling means obtains control after said interrupt generated by said PCMCIA socket adapter occurs.

15. The apparatus as claimed in claim 9, wherein said method further comprises the step of:

virtual device driver Card Services interface means, said virtual device driver Card Services interface means providing a Card Services interface to at least one virtual device driver in said Windows operating system, said virtual device driver Card Services interface means comprising a virtual device driver service call into said system service means.

16. A computer implemented method for providing PCMCIA Card Services to Windows application running on the Windows operating system or a DOS application running in a DOS virtual machine in said WindOws Operating system, said method comprising the steps of:

calling a software function in a Card Services Dynamic Link Library from said Windows application, said software function corresponding to a Card Services function such that said software function performs the requirements of the corresponding Card Services function; and posting a message to a Card Services Background Processing application from said software function in said Card Services Dynamic Link Library when a Card Services function must be performed asynchronously, said Card Services Background Processing application comprising a standard Windows application; and calling a Card Services virtual device driver from said software function in said Card Services Dynamic Link Library when a Card Services function needs Ring 0 operating system services;

hooking a software interrupt such that a DOS client handling routine in said Card Services virtual device driver obtains control when said DOS application executes a software interrupt instruction; and calling a Card Services function in said Card Services Dynamic Link Library from said DOS client handling routine in said Card Services virtual device driver when said Card Services virtual device driver obtains control after said software interrupt instruction is executed by said DOS Card Services client application.

17. The computer implemented method as claimed in claim 16, wherein said method further comprises the step of:
calling a client callback routine into said Windows application from said Card Services Background Processing application to inform said Windows application of a result asynchronously generated by said Card Services Background Processing application.

18. The computer implemented method as claimed in claim 17, wherein said method further comprises the step of:

maintaining a Card Services database in said Card Services Dynamic Link Library, said Card Services database containing a set of resources available to said Card Services Dynamic Link Library.

19. The computer implemented method as claimed in claim 18, wherein said method further comprises the step of:

calling a Socket Services software layer from said Card Services Dynamic Link Library to a perform a hardware related function, said step of calling said Socket Services software layer performed using a DOS Protected Mode Interface (DPMI) interface.

20. The computer implemented method as claimed in claim 16, wherein a callback into said DOS Card Services client application is performed by the substeps of:

calling said Card Services virtual device driver from said Card Services Background Processing application with a result of a Card Services function performed by said Card Services Background Processing application; and calling a callback routine in said DOS Card Services client application from said Card Services virtual device driver using nested execution, said result of said Card Services function provided to said DOS Card Services client application located in said DOS Virtual machine.

21. The computer implemented method as claimed in claim 17, wherein said method further comprises the steps of:

virtualizing an IRQ interrupt generated by a PCMCIA socket adapter such that said Card Services virtual device driver obtains control when said IRQ interrupt generated by said PCMCIA socket adapter occurs; and handling said interrupt generated by a PCMCIA socket adapter by calling an interrupt handing function in said Card Services Dynamic Link Library from said Card Services virtual device driver when said Card Services virtual device driver obtains control after said IRQ interrupt generated by said PCMCIA socket adapter occurs.

22. The computer implemented method as claimed in claim 17, wherein said method further comprises the step of:

calling a Card Services interface in said Card Services virtual device driver using a virtual device driver service call in said Card Services virtual device driver.

23. In a computer system running a Windows enhanced mode operating system, a computer implemented method for providing PCMCIA Card Services to Windows Card Services clients and to at least one DOS Card Services client application running in a DOS virtual machine such that said Card Services does not use real mode memory below a 640K boundary, said Card Services client running in a DOS virtual machine accessing Card Services using a software interrupt, said method comprising the steps of:

creating a Card Services Dynamic Link Library, said Card Services Dynamic Link Library comprising a plurality of software function that correspond to a plurality of Card Services functions, said Card Services Dynamic Link Library located in said system virtual machine; said Card Services Dynamic Link Library accessible to said Windows Card Services clients;

providing a Card Services virtual device driver, said Card Services virtual device driver performing Ring 0 operating system services for said Card Services Dynamic Link Library;

hooking said software interrupt with said Card Services virtual device driver such that said Card Services virtual device driver obtains control when said DOS Card Services client application executes a software interrupt instruction; and calling a Card Services function in said Card Services Dynamic Link Library from said Card Services virtual device driver when said Card Services virtual device driver obtains control after said software interrupt instruction is executed by said DOS Card Services client application; and posting a message containing said set of function parameters to a Card Services Background Processing application from said software function if said software function requires asynchronous processing.

24. A computer implemented method for providing a Card Services function to a Windows Card Services client and to at least one DOS Card Services client application running in a DOS virtual machine on the Windows operating system, said method comprising the steps of:

loading a set of registers with a set of Card Services function parameters from within said DOS Card Services client application;

executing a software interrupt instruction from said DOS Card Services client application to request said Card Services function;

hooking said software interrupt with a Card Services virtual device driver such that said Card Services virtual device driver obtains control when said DOS Card Services client application executes said software interrupt instruction; and translating said set of Card Services function parameters within said Card Services virtual device driver into a set of protected mode Card Services function parameters;

suspending execution of said DOS virtual machine;

calling a software function in a Card Services Dynamic Link Library, said step of calling a software function providing said set of protected mode Card Services function parameters to said software function, said software function returning a set of protected mode return codes;

posting a message containing said set of function parameters to a Card Services Background Processing application from said software function if said software function requires asynchronous processing;

translating said set of protected mode return codes into a set of real mode return codes for said DOS Card Services client application;

unsuspending execution of said DOS virtual machine; and returning from said Card Services virtual device driver to said DOS Card Services client application.

25. The computer implemented method as claimed in claim 24, said method comprising the steps of:

virtualizing an IRQ interrupt generated by a PCMCIA socket adapter such that said Card Services virtual device driver obtains control when said IRQ interrupt generated by said PCMCIA socket adapter occurs; and executing a hardware interrupt routine in said Card Services virtual device driver when said IRQ interrupt generated by said PCMCIA socket adapter occurs, said hardware interrupt routine performing the following substeps;

scheduling a change to a system Virtual Machine if said system Virtual Machine is not running; and posting a message to a Card Services Windows application for background processing.

\* \* \* \* \*

UNITED STATES PATENT AND TRADEMARK OFFICE
CERTIFICATE OF CORRECTION

PATENT NO. : 5,696,970
DATED : December 9, 1997
INVENTOR(S) : Sandage et al.

It is certified that error appears in the above-identified patent and that said Letters Patent is hereby corrected as shown below:

In column 9 at line 25 delete "spedfication" and insert --specification--

In column 14 at line 6 delete "Mter" and insert --after--

Signed and Sealed this

Twenty-first Day of April, 1998

Attest:

BRUCE LEHMAN

Attesting Officer

Commissioner of Patents and Trademarks